United States Patent
Yu et al.

(10) Patent No.: US 7,552,251 B2
(45) Date of Patent: Jun. 23, 2009

(54) SINGLE-CHIP MULTI-MEDIA CARD/SECURE DIGITAL (MMC/SD) CONTROLLER READING POWER-ON BOOT CODE FROM INTEGRATED FLASH MEMORY FOR USER STORAGE

(75) Inventors: I-Kang Yu, Palo Alto, CA (US); Abraham C. Ma, Fremont, CA (US); Charles C. Lee, Cupertino, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

(21) Appl. No.: 12/128,916

(22) Filed: May 29, 2008

(65) Prior Publication Data
US 2008/0228984 A1 Sep. 18, 2008

Related U.S. Application Data

(63) Continuation-in-part of application No. 10/707,277, filed on Dec. 2, 2003, now Pat. No. 7,103,684, and a continuation of application No. 11/309,594, filed on Aug. 28, 2006, now Pat. No. 7,383,362.

(51) Int. Cl.
*G06F 13/28* (2006.01)
*G06F 9/00* (2006.01)

(52) U.S. Cl. .............. 710/22; 710/23; 713/1; 713/2; 713/100

(58) Field of Classification Search ............ None
See application file for complete search history.

(56) References Cited

U.S. PATENT DOCUMENTS

2006/0075395 A1* 4/2006 Lee et al. ............... 717/168

\* cited by examiner

*Primary Examiner*—Alan Chen
(74) *Attorney, Agent, or Firm*—Stuart T. Auvinen; gPatent LLC (57) ABSTRACT

A Multi-Media Card/Secure Digital (MMC/SD) single-chip flash device contains a MMC/SD flash microcontroller and flash mass storage blocks containing flash memory arrays that are block-addressable rather than randomly-addressable. MMC/SD transactions from a host MMC/SD bus are read by a bus transceiver on the MMC/SD flash microcontroller. Various routines that execute on a CPU in the MMC/SD flash microcontroller are activated in response to commands in the MMC/SD transactions. A flash-memory controller in the MMC/SD flash microcontroller transfers data from the bus transceiver to the flash mass storage blocks for storage. Rather than boot from an internal ROM coupled to the CPU, a boot loader is transferred by DMA from the first page of the flash mass storage block to an internal RAM. The flash memory is automatically read from the first page at power-on. The CPU then executes the boot loader from the internal RAM to load the control program.

11 Claims, 8 Drawing Sheets

PRIOR ART

SINGLE-CHIP MULTI-MEDIA CARD/SECURE DIGITAL (MMC/SD) CONTROLLER READING POWER-ON BOOT CODE FROM INTEGRATED FLASH MEMORY FOR USER STORAGE

RELATED APPLICATION

This application is a continuation of U.S. Ser. No. 11/309,594 filed Aug. 28, 2006, now U.S. Pat. No. 7,383,362, which is a Continuation-In-Part (CIP) of the co-pending application for "Single-Chip USB Controller Reading Power-On Boot Code from Integrated Flash Memory for User Storage", U.S. Ser. No. 10/707,277, filed Dec. 2, 2003, now U.S. Pat. No. 7,103,684.

FIELD OF THE INVENTION

This invention relates to flash memory storage, and more particularly to a Multi-Media Card/Secure Digital (MMC/SD) controller integrated with a parallel flash memory.

BACKGROUND OF THE INVENTION

Flash memory has gained wide acceptance for its non-volatile storage, which is ideal for portable devices that may lose power, since the data is not lost when stored in the flash memory. Flash memories are constructed from electrically-erasable programmable read-only memory (EEPROM) cells.

Rather than use a randomly-addressable scheme such as is common with dynamic-random-access memory (DRAM), many flash memories use a block-based addressing where a command and an address are sent over the data bus and then a block of data is read or written. Since the data bus is also used to send commands and addresses, fewer pins are needed on the flash-memory chip, reducing cost. Thus flash memory is often used as a mass-storage device rather than a randomly-addressable device.

Universal-Serial-Bus (USB) has become a popular standard interface for connecting peripherals to a host such as a personal computer (PC). USB-based flash-memory storage devices or "drives" have been developed to transport data from one host to another, replacing floppy disks. While large external flash drives may be used, smaller USB flash drives known as key-chain or key drives have been a rapidly growing market.

A USB flash-memory device can be constructed from a microcontroller, a flash-memory controller or interface, and one or more flash-memory chips. A serial interface on the microcontroller connects to the USB bus to the host, and data from the serial interface is transferred through the microcontroller to the flash controller and then written to the flash-memory chips.

The microcontroller usually contains an internal ROM with a control program that is read by the internal central processing unit (CPU) of the microcontroller when the microcontroller is booted or powered up. Once initialized with the control program, the CPU can control data transfers between the serial interface and the flash controller.

Sometimes the user may desire to connect to more than one USB flash-memory device. The user can install a USB hub, and then plug the USB flash-memory devices into the USB hub's downstream ports. USB hubs allow one USB port on a host to fan out to multiple end USB devices or endpoints. A basic USB hub has a repeater that repeats data from the host to all down-stream devices, while more intelligent hubs based on the USB 2.0 standard can buffer data to different downstream ports.

The parent application, now U.S. Pat. No. 7,103,684, disclosed a USB flash drive that did not need a read-only memory (ROM) for booting. The microcontroller in the USB flash drive was able to read boot code from the block-addressable flash memory and transfer the boot code to the microcontroller's RAM for execution.

Another popular bus standard is Multi-Media Card (MMC). An extension of MMC is known as Secure Digital (SD). MMC and SD flash devices are common today. It is desired to extend the ROM-less flash-memory-drive microcontroller of the parent application to MMC, SD, Memory Stick (MS) and other similar portable buses.

Figure 1:
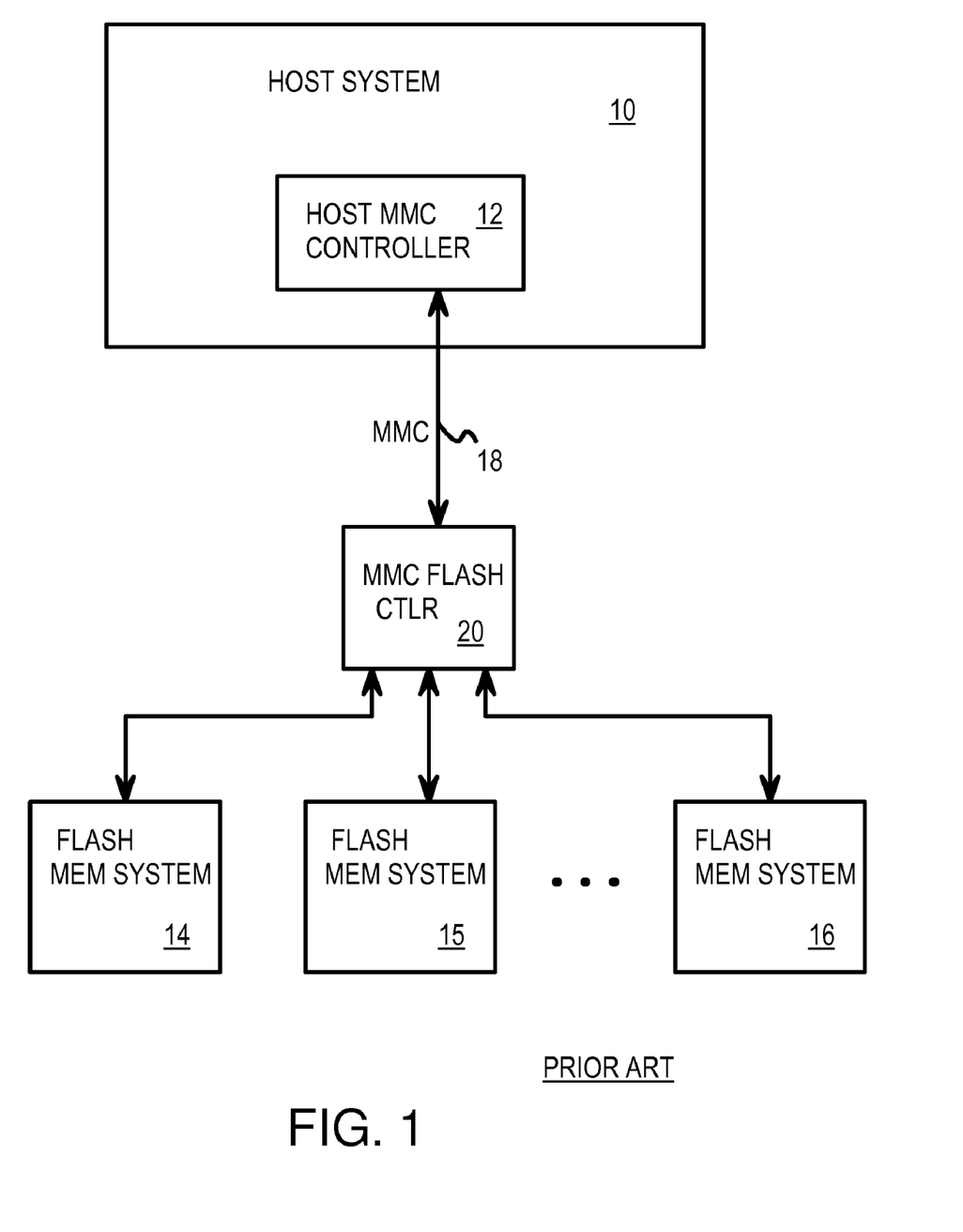
FIG. 1 shows a prior-art MMC flash controller that connects to multiple flash-memory devices.

FIG. 1 shows a prior-art MMC flash controller that connects to multiple flash-memory devices. Host 10 includes MMC host controller 12 that generates transactions to MMC devices over MMC bus 18 using the MMC protocol. MMC controller 20 is connected to a cable containing MMC bus 18. MMC controller 20 fans out commands on MMC bus 18 to several downstream flash-memories that connect over additional bus segments.

Three flash-memory systems 14, 15, 16 are connected to MMC controller 20 by bus segments. Flash-memory system 14 can be accessed by MMC host controller 12 through MMC controller 20. Since MMC controller 20 passes all host transfers through to downstream devices, flash-memory system 15 is readable to host 10 as a second flash drive, while flash-memory system 16 is readable to the host as a third flash drive. Alternately, all three flash-memory systems 14, 15, 16 may appear to host 10 as a single memory.

Some board or device manufacturers may integrate MMC controller 20 together with flash-memory systems 14, 15, 16 on a single MMC flash card or box. However, this can be expensive when MMC flash-memory systems 14, 15, 16 are flash-memory chips, since each chip may have many pins. For example, a flash-memory chip with an 8-bit or 16-bit data bus may have 48 total pins. This can increase the size of the MMC flash device. Power consumption is higher due to the large number of data lines in the parallel buses to each flash-memory chip.

What is desired is to integrate a microcontroller with a flash-memory array. It is desired to have a wide internal bus from the microcontroller to the flash-memory array to improve the data bandwidth while having few external pins to reduce cost and required board space.

It is further desired to eliminate the internal ROM on the microcontroller. Instead of booting from the internal ROM, it is desired to use a control program stored in the flash-memory array. However, it is also desired to use a block-addressed rather than a randomly-addressable array for the flash storage.

DETAILED DESCRIPTION

The present invention relates to an improvement in flash memory. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 2:
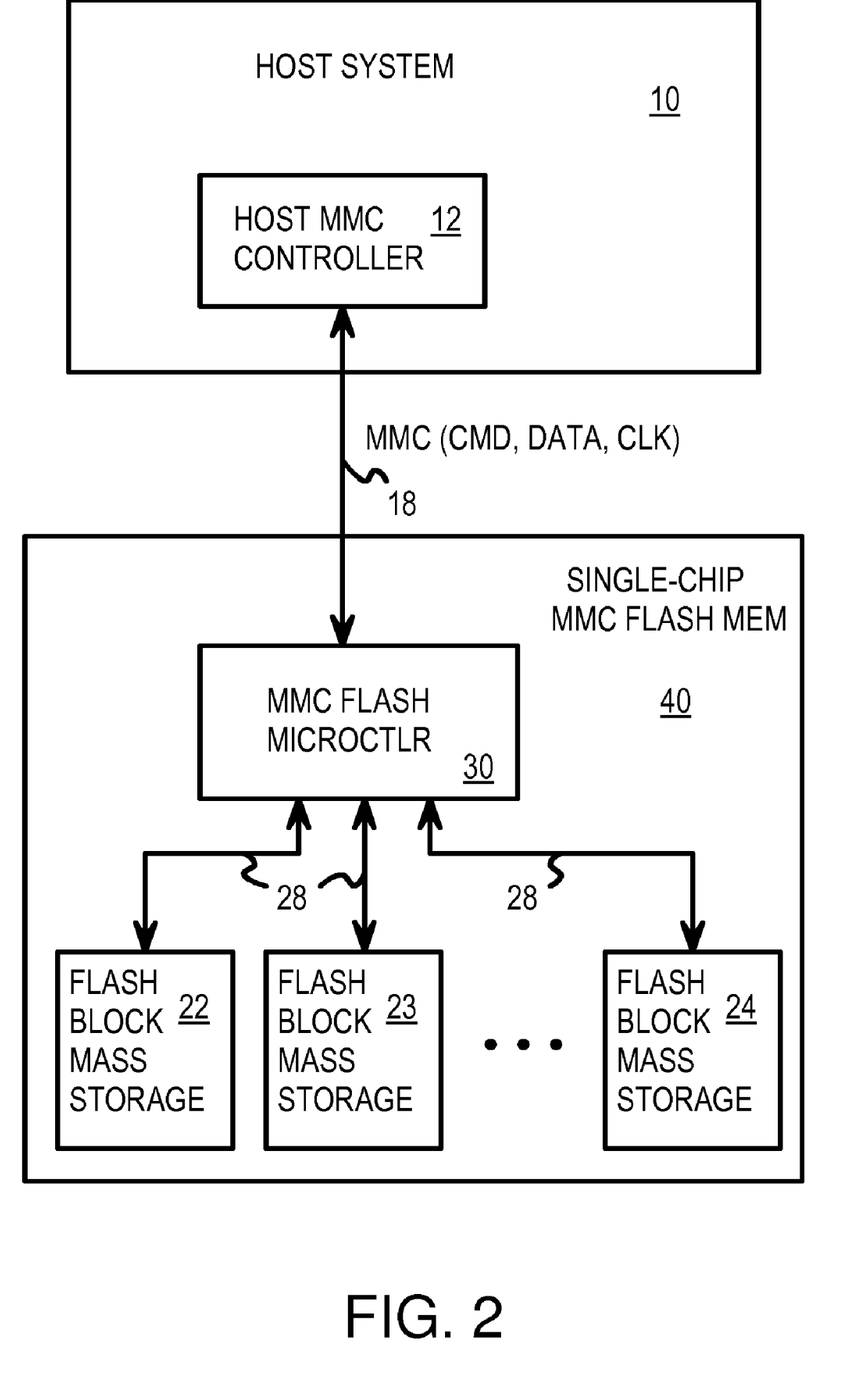
FIG. 2 is a block diagram of a flash microcontroller integrated with MMC flash mass storage blocks.

FIG. 2 is a block diagram of a flash microcontroller integrated with MMC flash mass storage blocks. MMC host controller 12 for host 10 sends transactions over MMC bus 18 to MMC single-chip flash device 40. MMC flash microcontroller 30 on MMC single-chip flash device 40 receives and responds to transactions from host 10 over MMC bus 18. MMC flash microcontroller 30 has an interface that acts as the final MMC endpoint for transactions on MMC bus 18 from host 10. Transactions can include commands and data streams. The commands activate routines that execute on MMC flash microcontroller 30, including routines to access blocks of flash memory.

MMC flash microcontroller 30 also contains a flash-memory controller that sends data on internal flash buses 28 to flash mass storage blocks 22, 23, 24. Flash mass storage blocks 22, 23, 24 respond to internal requests from MMC flash microcontroller 30 by transferring data over internal flash buses 28.

Since internal flash buses 28 are internal to MMC single-chip flash device 40, external pins are not required for the interface to flash memory. A wider internal bus of 32, 64, or 128 bits can be used for internal flash buses 28, improving data bandwidth. However, flash mass storage blocks 22, 23, 24 are not randomly accessible. Instead, a command and an address are transferred as data over internal flash buses 28 to indicate a block of data to transfer from flash mass storage blocks 22, 23, 24. Thus flash mass storage blocks 22, 23, 24 are block-addressable mass storage rather than random-access memory (RAM).

Flash mass storage blocks 22, 23, 24 may be aggregated together by MMC flash microcontroller 30, which maps and directs data transactions to selected flash storage blocks 22, 23, 24. Since MMC flash microcontroller 30 performs memory management, flash storage blocks 22, 23, 24 appear as a single, contiguous memory to host 10.

Figure 3:
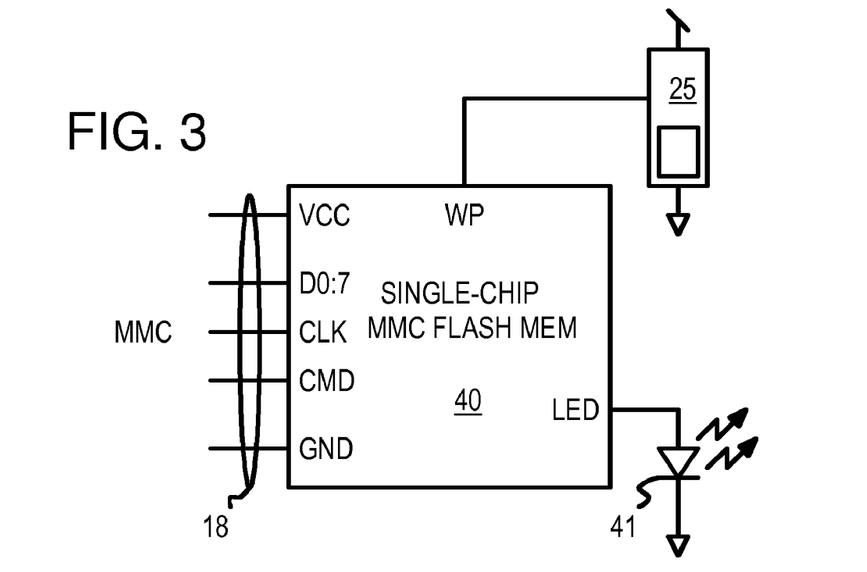
FIG. 3 shows external pin connections to a MMC single-chip flash device.

FIG. 3 shows external pin connections to a MMC single-chip flash device. MMC single-chip flash device 40 connects to the host through MMC bus 18, which has power (Vcc), ground, a clock that is input to MMC single-chip flash device 40, and a parallel data bus. The data bus may be 4 or 5 bits for older versions of the SD and MMC standards, or 8 bits for more recent MMC versions. A command pin CMD may also be present for the SD standard or may be multiplexed with a MMC data pin. The data pins are full-swing non-differential and carry parallel data synchronized to the clock.

A write-protect (WP) pin connects externally to switch 25. Switch 25 can be switched by the user to indicate write-protect or write-enable modes of the flash memory inside MMC single-chip flash device 40.

A status output pin for a light-emitting diode (LED) can be included on some embodiments. The status-LED pin can drive LED 41 to indicate a status of MMC single-chip flash device 40. For example, LED 41 can be made to blink when the internal flash memory is being written so that the user does not unplug the device before writing is completed.

Relatively few pins are needed for MMC single-chip flash device 40. Since MMC bus 18 is 10 pins or less, depending on the MMC version, excluding power and ground, as few as 10 signal pins are needed when no LED signaling is required. All commands, addresses, status, and data are carried as parallel clocked-data over the data lines in MMC bus 18. Additional power and ground pins, or pins for other functions could be added, but packages with 10 signal pins are relatively inexpensive and require little board space. The total pin count on the package may be 20 or fewer pins. Power consumption is also reduced, since fewer higher-capacitance external signals are driven by MMC single-chip flash device 40.

Figure 4:
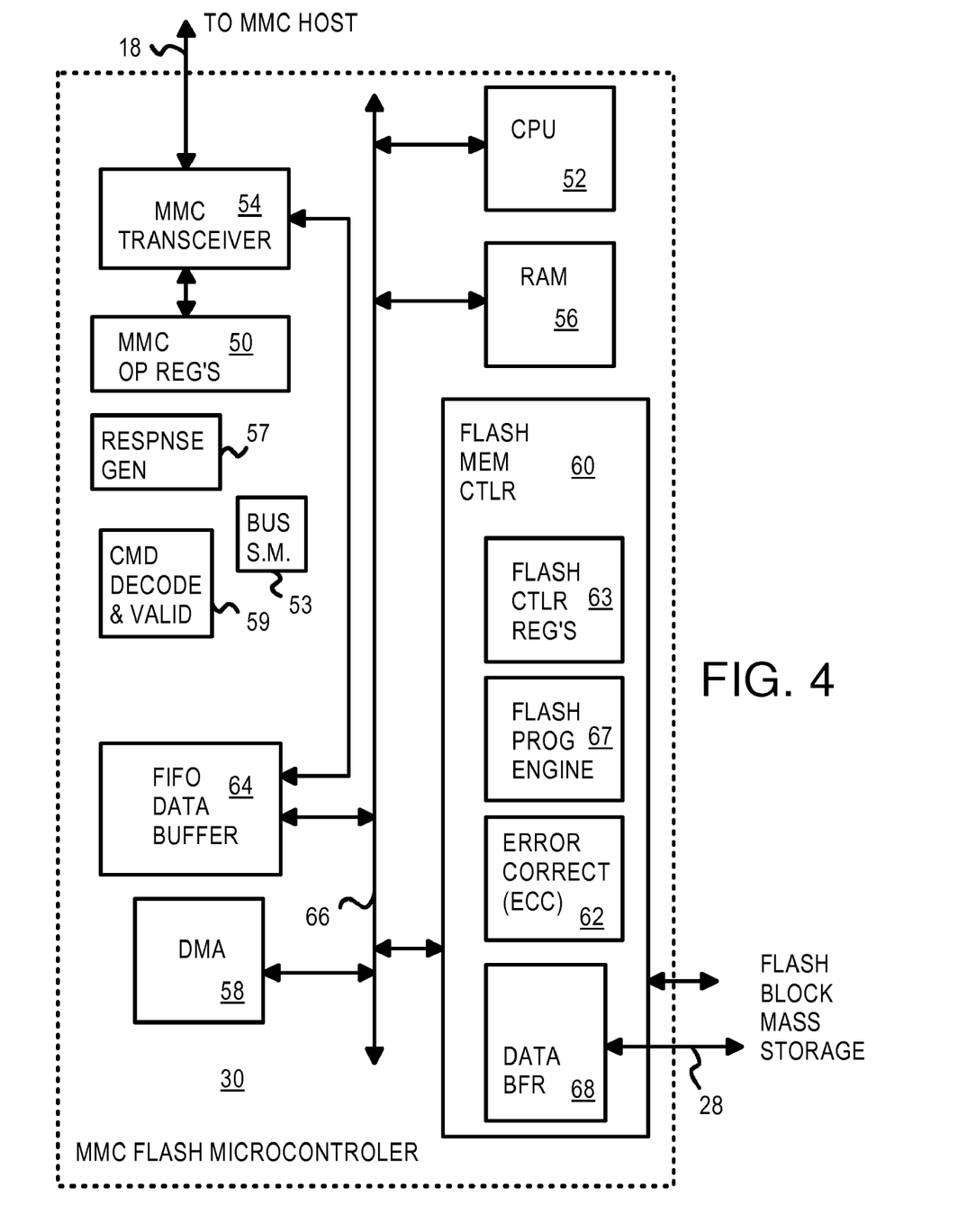
FIG. 4 is a block diagram of the MMC flash microcontroller inside the MMC single-chip flash device.

FIG. 4 is a block diagram of the MMC flash microcontroller inside the MMC single-chip flash device. Internal bus 66 connects CPU 52 with RAM 56, FIFO data buffer 64, direct-memory access (DMA) engine 58, and flash-memory controller 60. CPU 52 executes instructions from RAM 56, while DMA engine 58 can be programmed to transfer data between FIFO data buffer 64 and flash-memory controller 60. CPU 52 can operate on or modify the data by reading the data over bus 66. RAM 56 can store instructions for execution by the CPU and data operated on by the CPU.

MMC transceiver 54 connects to the clock CLK and parallel data lines D0:7 of MMC bus 18 and contains both a clocked receiver and a transmitter. An interrupt to CPU 52 can be generated when a new command is detected on MMC bus 18. CPU 52 can then execute a routine to handle the interrupt and process the new command.

MMC operating registers 50 include the protocol registers required by the MMC specification. Registers may include a data-port, write-protect, flash select, flash status, interrupt, and identifier registers. Other extension registers may also be present.

Command decode and validator 59 detects, decodes, and validates commands received over MMC bus 18. Valid commands may alter bus-cycle sequencing by bus state machine 53, and may cause response generator 57 to generate a response, such as an acknowledgement or other reply.

The transmit and receive data is stored in FIFO data buffer 64, perhaps before or after passing through a data-port register in MMC operating registers 50. Commands and addresses from the MMC transactions can also be stored in FIFO data buffer 64, to be read by CPU 52 to determine what operation to perform.

Flash-memory controller 60 includes flash data buffer 68, which may contain the commands, addresses, and data sent over internal flash buses 28 to flash mass storage blocks 22, 23, 24. Data can be arranged in flash data buffer 68 to match the bus width of internal flash buses 28, such as in 32 or 64-bit words. DMA engine 58 can be programmed by CPU 52 to transfer a block of data between flash data buffer 68 and FIFO data buffer 64.

Flash control registers 63 may be used in conjunction with flash data buffer 68, or may be a part of flash memory buffer 68. Flash-specific registers in flash control registers 63 may include a data port register, interrupt, flash command and selection registers, flash-address and block-length registers, and cycle registers.

Error-corrector 62 can read parity or error-correction code (ECC) from flash mass storage blocks 22, 23, 24 and perform data corrections. The parity or ECC bits for data in flash data buffer 68 that is being written to flash mass storage blocks 22, 23, 24 can be generated by error-corrector 62.

Flash programming engine 67 can be a state machine that is activated on power-up reset. Flash programming engine 67 programs DMA engine 58 within the address of the boot loader code in the first page of flash mass storage block 22, and the first address in RAM 56. Then flash programming engine 67 commands DMA engine 58 to transfer the boot loader from flash mass storage block 22 to RAM 56. CPU 52 is then brought out of reset, executing the boot loader program starting from the first address in RAM 56. The boot loader program can contain instructions to move a larger control program from flash mass storage block 22 to RAM 56. Thus MMC flash microcontroller 30 is booted without an internal ROM on internal bus 66.

Figure 5:
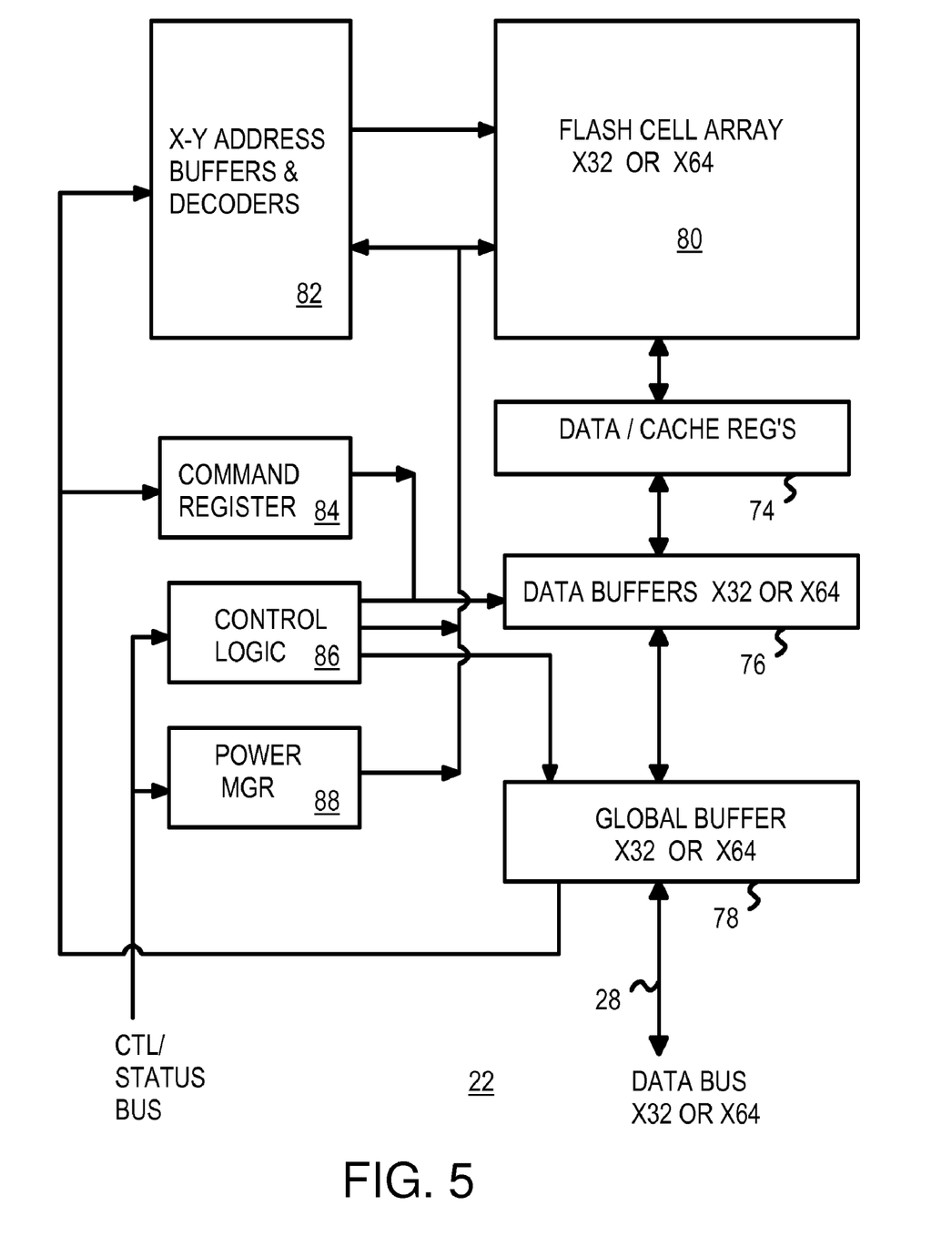
FIG. 5 is a block diagram of a flash mass storage block.

FIG. 5 is a block diagram of a flash mass storage block. Flash mass storage block 22 is on the same chip as MMC flash microcontroller 30 and is connected by internal flash bus 28 and a control and status bus. Flash memory array 80 contains the flash or EEPROM memory cells arranged as data words that match the width of internal flash bus 28, such as 32, 64, or 128 bits wide. Address signals for the rows and columns are generated by address buffers and decoder 82, which is loaded with an address that is sent over internal flash bus 28 and through global buffer 78.

A command sent over internal flash bus 28 is latched into command register 84 from global buffer 78. This command is decoded and activates control logic 86 to carry out a sequence of operations and generate a sequence of internal control to perform the operation, such as reading or erasing memory cells or latching an address or reporting a status back. Flash mass storage block 22 may be powered down when not in use by a command that activates power manager 88.

Data written into flash mass storage block 22 arrives on internal flash bus 28 and is initially latched by global buffer 78. The data is then sent to data buffers 78 to be driven onto flash memory array 80 for storage. Data may be temporarily held in data/cache registers 74 while being written to flash memory array 80.

Commands indicate a block of data to be transferred rather than individual bytes or words. For example, a page of 512 to 528 bytes or a multiple thereof could be transferred by a read or write command. Since one block address is transferred over internal flash bus 28 for all bytes in the block, the overhead time for the address is spread over many bytes of data and thus does not significantly reduce performance. Also, when blocks are aligned, the block address can have fewer address bits than a full byte or word address.

Some flash memory chips have a "first-page auto-read" mode that allows the first page of memory to be read after power up, before a command or an address is sent to the flash-memory chip. A similar mode can be provided for flash mass storage block 22 to allow the first page of flash memory to be read without sending an initial address or command. Power manager 88 detects the power-on condition and sets the address in address buffers and decoder 82 to the first address of the first page in flash memory array 80. When a read signal is sent over the control/status bus, a read command is executed with successive data words from this first page being read from flash memory array 80 to internal flash bus 28.

Figure 6:
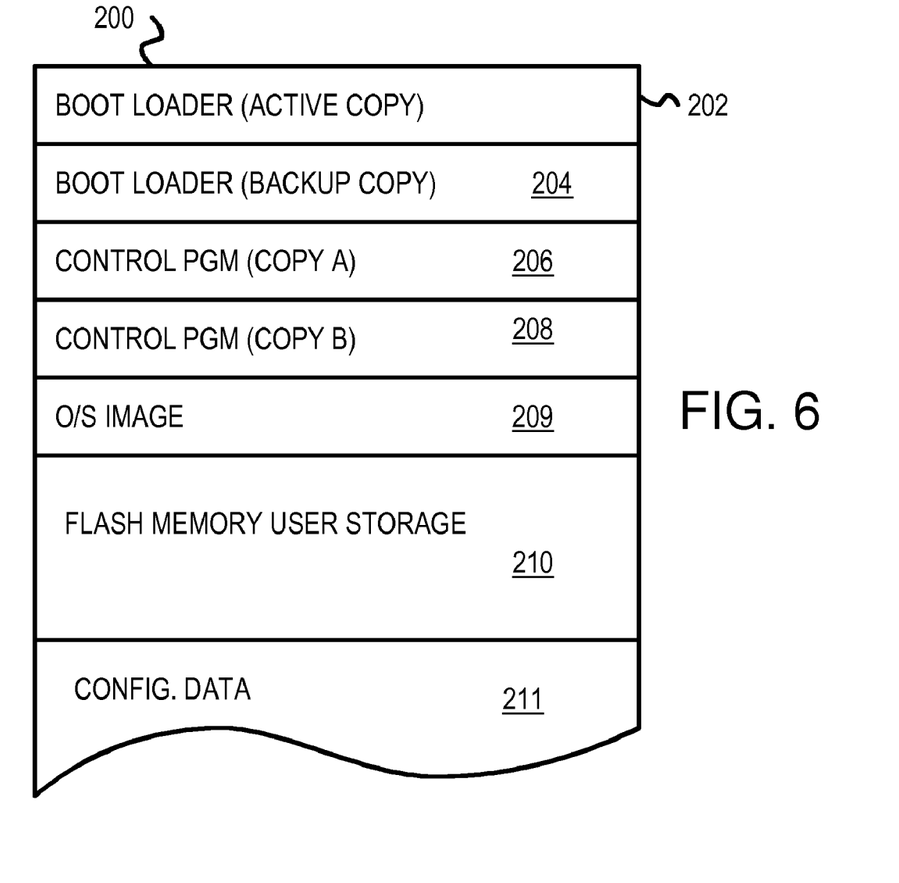
FIG. 6 is a diagram of the first page in the flash mass storage block.

FIG. 6 is a diagram of the first page in the flash mass storage block. This page is automatically read on power-up starting with the first data bytes. Flash memory space 200 has stored in it a first copy of boot loader program 202, starting at the first address on the first page. Backup copy 204 of the boot loader program follows boot loader program 202 and can be loaded in case of error.

Two copies 206, 208 of a control program are stored in flash memory space 200. When one copy contains an error, the other copy can be loaded. An image for the operating system (O/S) can be stored as OS image 209. OS image 209 can be a compiled executable code recognized only by the CPU. An image code has a minimum size and is more secure, protecting privacy.

The remaining addresses on the first page, and on subsequent pages of flash memory space 200 are used for user storage 210. Data from the host can be stored in user storage 210. Configuration data 211 may be present when error-correction is supported, such as when using Reed-Solomon error-correction code (ECC). Configuration data 211 contains error-correction data and may be located at the end of the address space.

Microcontroller ROM Eliminated

Since the boot loader program and the control program reside on the same flash mass storage blocks as the user or host data, a separate memory is not required for the boot loader or for the control program. Microcontrollers typically contain a ROM that contains the control program or boot loader. The ROM is read by the CPU over the internal CPU bus at power-up. The inventors have realized that this ROM is not needed of can be minimized for the MMC single-chip flash device.

Even though flash mass storage block 22 is not randomly-addressable, a first-page auto-read feature of flash memory can be used to locate the boot code on power-up. The boot code then can be transferred to the microcontroller's RAM for execution by the microcontroller CPU.

Figure 7:
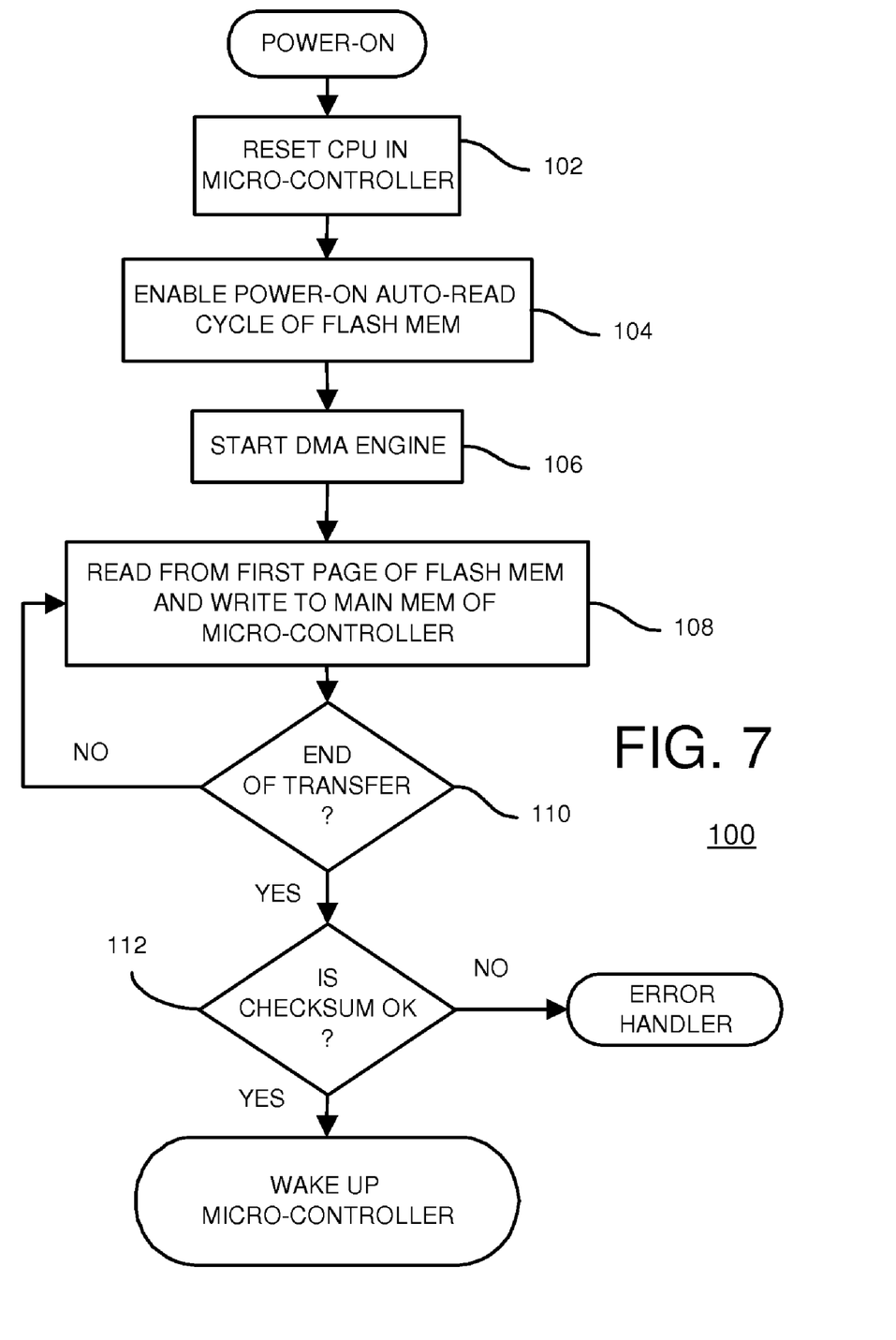
FIG. 7 is a flowchart of a power-up sequence that does not require a ROM on the internal microcontroller bus.

FIG. 7 is a flowchart of a power-up sequence that does not require a ROM on the internal microcontroller bus. Initial load sequence 100 is performed by a hardware state machine, flash programming engine 67 (FIG. 4), and then by DMA engine 58. A boot-loader program is read from the flash mass storage block through the flash-memory controller and written to the RAM on the internal bus before the microcontroller's CPU is taken out of reset.

At power-on the CPU in the MMC flash microcontroller remains in the reset state, step 102. The power manager in flash mass storage block 22 loads the starting address of the first page of flash memory into the address buffers and decoders, step 104, to enable auto-reading of the first page of flash memory. A command and an address do not have to be transferred to the flash memory for this initial auto-read of the first page. While the flash memory is not randomly-addressable, it is read sequentially starting from the first byte or word of the first page.

Flash programming engine 67 in flash-memory controller 60 comes out of reset and programs the DMA engine with source and target device addresses and an initial transfer length. The DMA engine begins transferring the boot code, step 106. The DMA engine reads from the first page of the flash memory, starting with the first data word, step 108. Data is read from flash mass storage block 22 through flash-memory controller 60, across internal bus 66 to RAM 56 (FIG. 4).

Data words continue to be transferred by the DMA engine until the initial transfer length is reached, step 110. The last bytes of the boot loader program can contain a checksum that is compared to a checksum generated by the DMA engine, step 112. When the checksums do not match, an error handler routine hardwired into flash programming engine 67 is activated, which can then read the backup copy of the boot loader program. When the checksum is good, the boot loader program has been successfully transferred from the first page of flash mass storage block 22 to the microcontroller's RAM. The microcontroller's CPU can then be brought out of reset. Flash programming engine 67 or the DMA engine can keep track of which copy of the boot loader is the active copy, or indicate to the control program when an error occurred. For example, flash programming engine 67 could contain a status register that the CPU can later read after booting.

Figure 8:
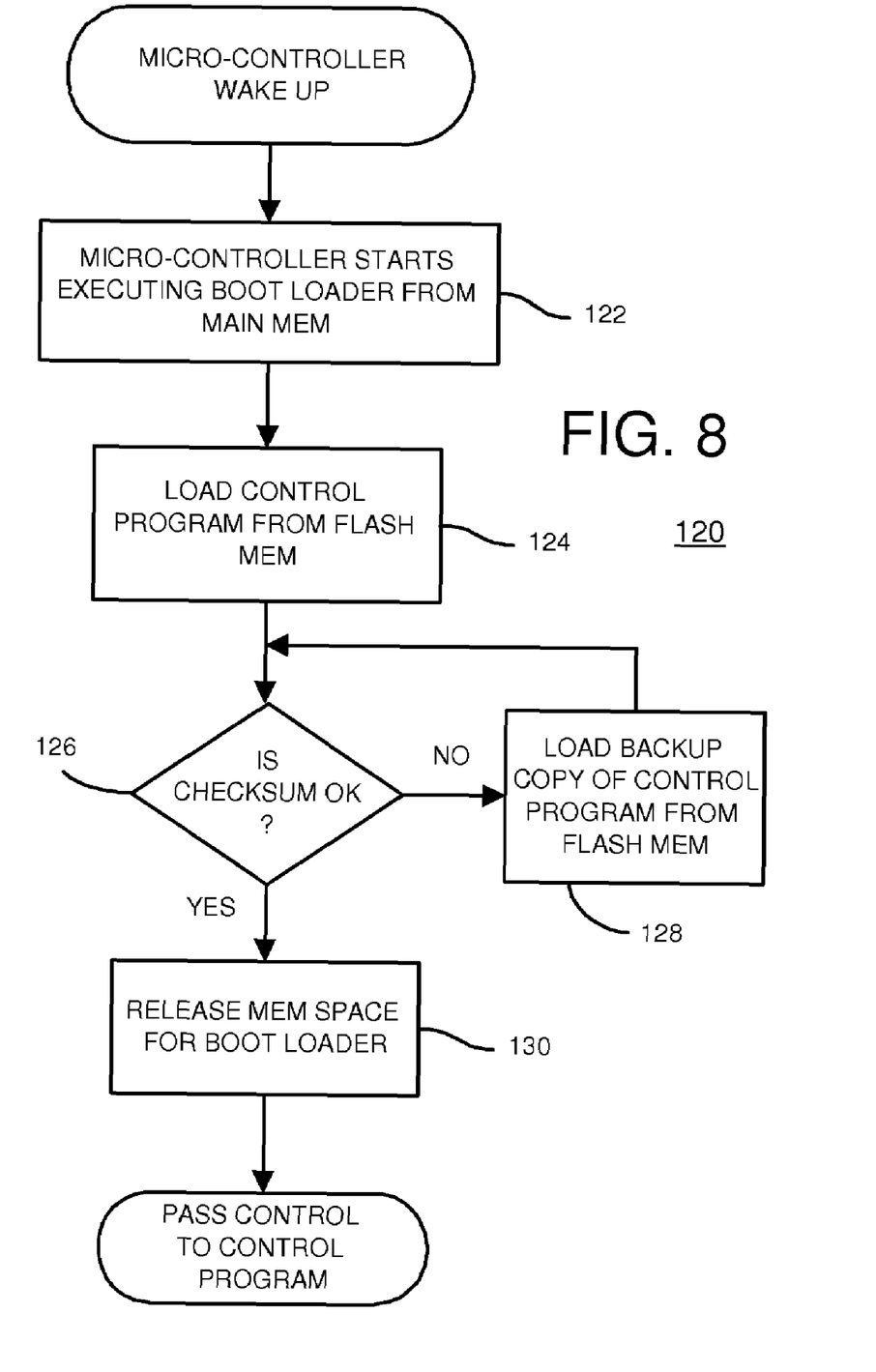
FIG. 8 is a flowchart of the microcontroller executing the boot loader program to load the control program.

FIG. 8 is a flowchart of the microcontroller executing the boot loader program to load the control program. The boot loader's instructions are executed by the CPU during control-program load sequence 120.

Once the boot loader program has been transferred to the RAM, the CPU in the microcontroller is taken out of reset. The CPU reads the first instruction at the first address in the RAM and begins executing the boot loader's instructions in the RAM, step 122. The boot loader contains CPU instructions to read the control program from the first page of flash mass storage block 22. This control program is read and transferred to the microcontroller's RAM, step 124.

A checksum at the end of the control program is checked against an expected value such as zero, step 126. If the checksum does not match the expected value, the back-up copy of the control program is loaded from the flash mass storage block, step 128. Once the checksum is correct after loading either the first or backup copy of the control program, the memory space in the RAM used by the boot loader program can be released and over-written, step 130. The CPU then begins executing instructions from the control program. Normal operation can begin, such by as initializing the MMC operating registers.

Figure 9:
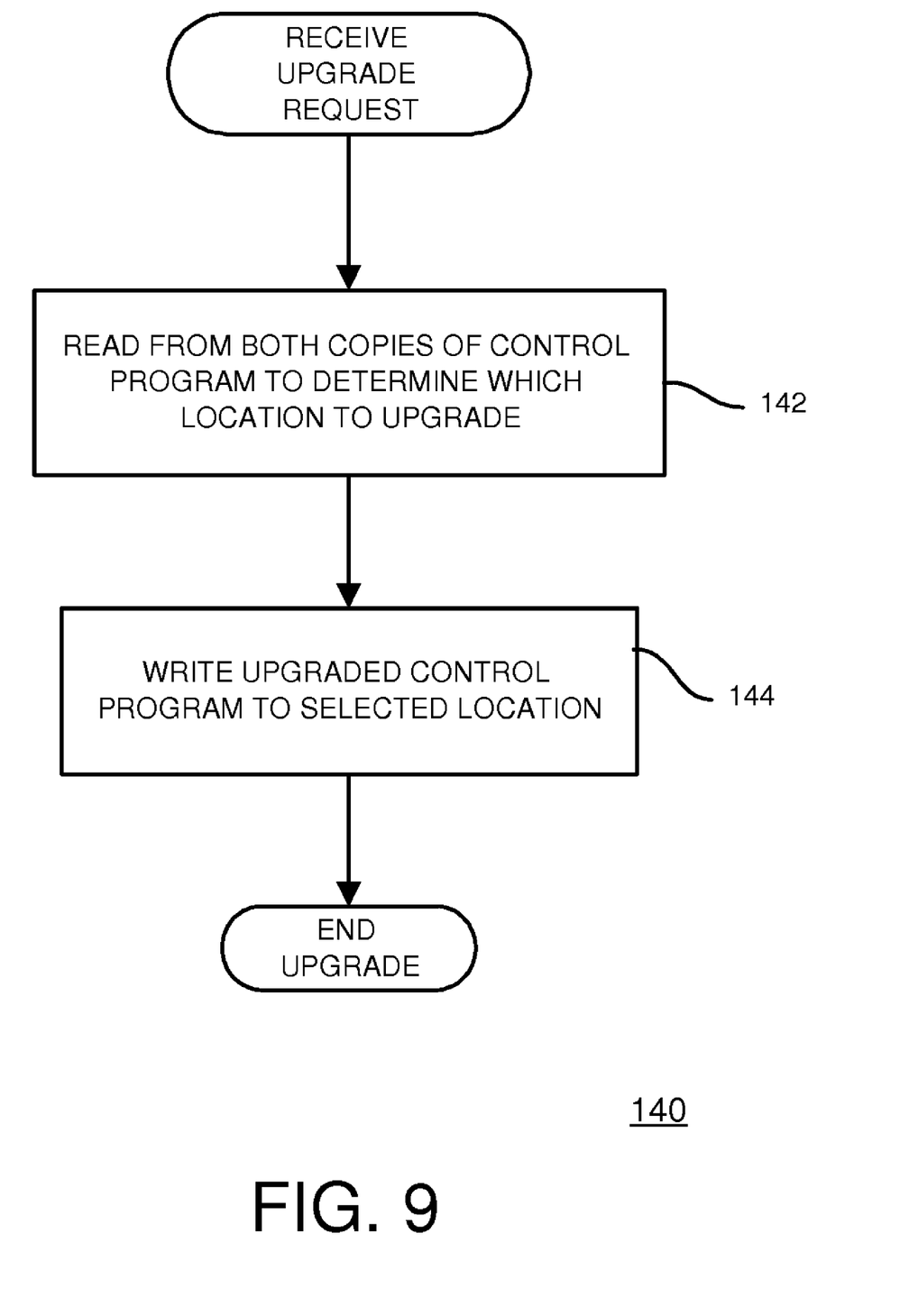
FIG. 9 is a flowchart of upgrading the control program.

Control Program Upgrading—FIG. 9

FIG. 9 is a flowchart of upgrading the control program. One benefit of storing the control program in flash mass storage block 22 rather than in a ROM on the microcontroller is that the control program can be upgraded by writing to the first page of the flash memory. Hardwired ROM cannot be upgraded: discovery of a program bug may require re-tooling the chip photo masks.

Upgrade routine 140 can be activated when a control-program-upgrade request command is received from the host. The CPU reads both copies of the control program in flash memory to determine which copy is the active copy. The active copy in RAM can be compared to the two copies in flash memory to determine which copy matches the active copy in RAM. The non-matching copy is the last-known-good copy and the copy replaced by the upgraded control program if the active copy is determined to be as reliable as the last known good copy. Otherwise, the active copy can be over-written.

One of the two copies of the control program is indicates as the active copy and the other as the backup copy. For example, a flag stored in memory could designate which copy is the active copy. Alternately, the flag can be eliminated by having the executing control program read both copies from the flash memory and compared each to the copy in the RAM that the CPU is executing from to determine which copy is the active copy. Version numbers could also be read and compared. One of the two copies of the control program in the flash mass storage block is selected for replacement, step 142. The upgraded copy of the control program sent by the host then over-writes the selected copy in the flash mass storage blocks, step 144. The upgraded program written in can be verified if desired.

The control program is thus field loadable and upgradeable though the MMC bus to the host. New features can be added to the control program, and bugs can be fixed. The control program code is no longer frozen at the time of manufacture. This is a significant advantage over a microcontroller with a hard-wired ROM. The boot loader program could also be upgraded, but this is not likely to be needed due to the relative simplicity of the boot loader program. Eliminating the ROM also can reduce manufacturing cost.

ALTERNATE EMBODIMENTS

Several other embodiments are contemplated by the inventors. For example different numbers and arrangements of MMC flash storage blocks can connect to the MMC switch. Rather than use MMC buses, other buses may be used such as Memory Stick, PCI Express bus, IDE bus, Serial ATA (SATA) bus, etc. Additional pins can be added or substituted for the MMC data pins. A multi-bus-protocol chip could have an additional personality pin to select which bus interface to use, or could have programmable registers. Rather than have a MMC microcontroller, a Memory Stick microcontroller could be substituted, for use with a memory-stick interface.

While the invention has been described using a MMC controller, an SD controller may be substituted. A combined controller that can function for both MMC and SD may also be substituted. SD may be considered an extension of MMC, or a particular type of MMC, rather than a separate type of bus.

While the invention has been described as not requiring ROM for booting, some ROM may still be present on the chip. For example, a revision number may be included in a small ROM. Hard-wired gates that are tied to power or ground may also function as a read-only memory. While such ROM may be present, ROM is not required for storing boot code or booting instructions. A few bytes or more of ROM may be thus present for other purposes.

The mode logic could sense the state of a pin only at power-on rather than sense the state of a dedicated pin. A certain combination or sequence of states of pins could be used to initiate a mode change, or an internal register such as a configuration register could set the mode.

The microcontroller and MMC components such as the bus interface, DMA, flash-memory controller, transaction manager, and other controllers and functions can be implemented in a variety of ways. Functions can be programmed and executed by the CPU or other processor, or can be implemented in dedicated hardware, firmware, or in some combination. Many partitioning of the functions can be substituted.

Data and commands may be routed in a variety of ways, such as through data-port registers, FIFO or other buffers, the CPU's registers and buffers, DMA registers and buffers, and flash registers and buffers. Some buffers may be bypassed or eliminated while others are used or present. Virtual or logical buffers rather than physical ones may also be used. Data may be formatted in a wide variety of ways.

The host can transfer standard MMC commands and data transactions to the MMC transceiver during a transaction. Other transaction types or variations of these types can be defined for special purposes. These transactions may include a flash-controller-request, a flash-controller-reply, a boot-loader-request, a boot-loader-reply, a control-program-request, a control-program-reply, a flash-memory-request, and a flash-memory-reply. The flash-memory request/reply may further include the following request/reply pairs: flash ID, read, write, erase, copy-back, reset, page-write, cache-write and read-status.

The host may be a personal computer (PC), a portable computing device, a digital camera, a phone, a personal digital assistant (PDA), or other electronic device.

The boot loader and control program could be larger than the first page of the flash memory or could be less than the size of the first page. The entire first page or just a portion of the first page could be transferred. Different page sizes could be substituted. One of the flash mass storage blocks 22, 23, 24 could be designated to respond during the first-page auto-read sequence and not the others. Backup copies could be kept in the others of flash mass storage blocks 22, 23, 24. More than one backup copy could be kept. The control program could call still other programs or routines. More complex memory management could be added.

The CPU could be taken out of reset but kept in a hold state or otherwise suspended from execution while the boot loader and control program are being transferred from the flash mass storage block. Several re-tries of reading or writing the boot loader or control program could be attempted.

Wider or narrower data buses and flash-memory blocks could be substituted, such as 4, 5, 8, 16, 32, 64, 128, 256-bit, or some other width data channels. Alternate bus architectures with nested or segmented buses could be used internal or external to the microcontroller. Two or more internal buses can be used in the MMC flash microcontroller to increase throughput. More complex switch fabrics can be substituted for the internal buses.

The flash mass storage blocks can be constructed from any flash technology including NAND, NOR, AND, or multi-level-logic memory cells. Data striping could be used with the flash mass storage blocks 22, 23, 24 in a variety of ways, as can parity and error-correction code (ECC). Data re-ordering can be adjusted depending on the data arrangement used to prevent re-ordering for overlapping memory locations. An MMC switch could be integrated with other components or could be a stand-alone chip. The MMC switch could also be integrated with MMC single-chip flash devices 40. While a single-chip device has been described, separate packaged chips or die may be stacked together while sharing I/O pins, or modules may be used.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. Sect. 1.72(b). Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A single-chip flash device comprising:
an interface to a host bus that connects to a host;
a bus transceiver for detecting and processing commands sent over the host bus;
a buffer for storing data sent over the host bus;
an internal bus coupled to the buffer;
a random-access memory (RAM) for storing instructions for execution; the RAM coupled to the internal bus,
a central processing unit (CPU) coupled to the internal bus, the CPU accessing and executing instructions in the RAM;
a flash-memory controller, coupled to the internal bus, for generating flash-control signals and for buffering commands, addresses, and data to a flash bus;
a direct-memory access (DMA) engine, coupled to the internal bus, for transferring data over the internal bus;
flash mass storage blocks, coupled to the flash-memory controller, for storing non-volatile data for the host, the data in the flash mass storage blocks being block-addressable and controlled by the flash-control signals;
a flash programming engine, activated by a reset, for initially programming the DMA engine to transfer an initial program of instructions from the flash mass storage blocks to the RAM before the CPU begins execution of instructions after the reset; and
wherein the flash-memory controller is coupled to the flash mass storage blocks that are block-addressable;
the flash bus having parallel data lines for transferring data from the flash-memory controller to the flash mass storage blocks, the flash bus also carrying a command to the flash mass storage blocks over the parallel data lines and also carrying a flash address over the parallel data lines;
wherein a block of data in the flash mass storage blocks is addressable by the flash-memory controller sending the command and a physical address over the parallel data lines, the command and the physical address being used to transfer the block of data over the parallel data lines as a plurality of data words transferred in a plurality of bus cycles,
wherein the flash mass storage blocks comprise a plurality of multi-level-logic (MLC) memory cells.

2. The single-chip flash device of claim 1 wherein the host bus is a Multi-Media Card (MMC) bus, or a Secure Digital (SD) bus, or a Universal Serial Bus (USB), or a Memory-Stick bus, or a Peripheral Component Interconnect (PCI) Express bus, or an integrated device electronics (IDE) bus, or a Serial ATA (SATA) bus, or a bus having parallel data lines and a clock.

3. A dual-mode flash drive comprising:
a dual-mode switch that connects to a host over a host bus, and connects to downstream devices over a plurality of buses;
a flash microcontroller having a processor;
a main memory coupled to the processor for storing instructions for execution by the processor;
an interface for switching to one of a plurality of buses;
a plurality of single-chip flash devices, coupled to the dual-mode switch as the downstream devices, each single-chip flash device comprising:

a flash-memory controller;

a plurality of flash mass storage blocks that are block-accessible by the processor through the flash-memory controller;

a direct-memory access (DMA) engine for directly transferring data and instructions over an internal bus among the interface, the main memory, the processor, and the flash-memory controller;

a flash programming engine for initially programming the DMA engine to read an initial program from a first page of the plurality of flash mass storage blocks and write the initial program to the main memory for execution by the processor.

4. The flash drive of claim 3 wherein the host bus comprises a Universal Serial Bus (USB), a Peripheral Component Interconnect (PCI) Express bus, an integrated device electronics (IDE) bus, a Serial ATA (SATA) bus, or a serial attached small-computer system interface (SCSI) bus.

5. A single-chip flash device comprising:

a Multi-Media Card/Secure Digital (MMC/SD) interface that connects to a host over a MMC/SD host bus;

a MMC/SD-flash microcontroller having a processor for executing instructions;

a main memory coupled to the processor for storing instructions for execution by the processor;

a flash-memory controller;

a flash mass storage block that is block-accessible by the processor through the flash-memory controller;

wherein the flash mass storage block comprises a plurality of multi-level-logic (MLC) memory cells;

a direct-memory access (DMA) engine for directly transferring data and instructions over an internal bus among the MMC/SD interface, the main memory, the processor, and the flash-memory controller;

a flash programming engine for initially programming the DMA engine to read an initial program from a first page of the flash mass storage block and write the initial program to the main memory for execution by the processor.

6. The single-chip flash device of claim 5 wherein the MMC/SD interface comprises:

a MMC/SD transceiver for receiving clocked data and commands from the host bus, and for driving data onto the host bus in response to a command;

MMC/SD operating registers for storing data and commands in a format specified by a Multi-Media Card (MMC) or Secure Digital (SD) specification; and a command decoder and validator, coupled to the MMC/SD operating registers, for decoding and validating a command received over the host bus by the MMC/SD transceiver.

7. The single-chip flash device of claim 6 wherein the single-chip flash device comprises a plurality of integrated circuits, each integrated circuit having at least one die.

8. A single-module flash device comprising:

a Multi-Media Card/Secure Digital (MMC/SD) interface that connects to a host over a MMC/SD host bus;

a MMC/SD-flash microcontroller having a processor for executing instructions;

a main memory coupled to the processor for storing instructions for execution by the processor;

a flash-memory controller;

a plurality of flash mass storage blocks that are block-accessible by the processor through the flash-memory controller;

wherein the plurality of flash mass storage blocks comprise a plurality of multi-level-logic (MLC) memory cells;

a direct-memory access (DMA) engine for directly transferring data and instructions over an internal bus among the MMC/SD interface, the main memory, the processor, and the flash-memory controller;

a flash programming engine for initially programming the DMA engine to read an initial program from a first page of the plurality of flash mass storage blocks and write the initial program to the main memory for execution by the processor.

9. The single-module flash device of claim 8 wherein the MMC/SD interface comprises:

a MMC/SD transceiver for receiving clocked data and commands from the host bus, and for driving data onto the host bus in response to a command;

MMC/SD operating registers for storing data and commands in a format specified by a Multi-Media Card (MMC) or Secure Digital (SD) specification; and a command decoder and validator, coupled to the MMC/SD operating registers, for decoding and validating a command received over the host bus by the MMC/SD transceiver.

10. The single-module flash device of claim 8 wherein the first page of the plurality of flash mass storage blocks is a first page in a first mass storage block in the plurality of flash mass storage blocks.

11. The single-module flash device of claim 8 wherein the single-module flash device comprises a plurality of integrated circuits, each integrated circuit having at least one die.

* * * * *